(12) United States Patent
Usui et al.

(10) Patent No.: US 6,357,327 B1
(45) Date of Patent: Mar. 19, 2002

(54) METHOD OF CUTTING METAL PIPE AND ITS APPARATUS

(75) Inventors: Masayoshi Usui; Fumihiko Shiozaki; Fujio Watanabe, all of Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/487,356

(22) Filed: Jan. 19, 2000

(30) Foreign Application Priority Data

Jan. 21, 1999 (JP) .......................................... 11-013050

(51) Int. Cl.[7] ........................ B26D 11/00; B26D 21/00; B26D 23/04; B26D 25/04
(52) U.S. Cl. ............................... 83/319; 83/54; 83/300; 83/454; 83/466.1; 83/692; 83/862; 83/917
(58) Field of Search .......................... 83/861, 862, 51, 83/54, 176, 452, 453, 454, 455, 465, 466.1, 613, 694, 692, 693, 695, 519, 300, 303, 310, 319, 320, 876, 52

(56) References Cited

U.S. PATENT DOCUMENTS

| 4,437,374 | A | * | 3/1984 | Brozym ........................ 83/454 |
| 4,457,200 | A | * | 7/1984 | Borzym ........................ 83/862 |
| 4,766,792 | A | * | 8/1988 | Borzym et al. ................ 83/319 |
| 5,088,365 | A | * | 2/1992 | Nolan ........................... 83/300 |
| 5,231,908 | A | * | 8/1993 | Skvarce et al. ............. 83/54 X |
| 5,893,315 | A | * | 4/1999 | Miller .......................... 83/320 |

* cited by examiner

Primary Examiner—Boyer Ashley
(74) Attorney, Agent, or Firm—Anthony J. Casella; Gerald E. Hespos

(57) ABSTRACT

An apparatus is provided for cutting a resin-coated metal pipe. The apparatus includes first and second spaced apart pairs of holding members for holding the pipe. First and second cut-off blades are movable between the pairs of holding members for making substantially diametrically opposed pre-cuts in the pipe. The cutting members move substantially in the same tangential direction to substantially balance rotational forces on the pipe. A cut blade then is penetrated through the pipe from the one pre-cut to the other to provide a clean precise cut in the pipe.

3 Claims, 7 Drawing Sheets

METHOD OF CUTTING METAL PIPE AND ITS APPARATUS

BACKGROUND OF THE INVENTION

1. Field of the invention

The present invention relates to a method of cutting a metal pipe and an apparatus for cutting a metal pipe orthogonally to a central axis line thereof and capable of effectively cutting even a metal pipe coated with a resin coating layer at an outer peripheral face thereof.

2. Description of the prior arts

FIG. 5 shows a conventional apparatus of this kind for cutting a metal pipe and a metal pipe 1 to be cut, is held from directions orthogonal to a central axis line of the metal pipe 1 such that a cut position thereof is sandwiched at portions forward and rearward from the cutting position by holding holes 8a and 9a generally in a semicircular shape respectively formed at opposed faces of a pair of holding members 2a and 3a capable of being opened and closed oppositely in the horizontal direction and other pair of holding members 2b and 3b spaced apart from the pair of holding members in the axial direction of the metal pipe 1.

Further, in respect of the metal pipe 1, there is arranged a cut-off blade 5 for cutting off a portion of a pipe wall of the metal pipe 1 at a position of cutting the metal pipe 1 orthogonally to a central axis line of the metal pipe 1 and movably in an arrow mark X direction which is a direction of a tangential line of an outer peripheral face thereof. Further, there is arranged a cut blade 6 which is movable in an arrow mark Y direction constituting a direction orthogonal to the central axis line for cutting to penetrate the metal pipe 1 at a deficient wall portion where a portion of the pipe wall has been cut off by the cut-off blade 5. Accordingly, the arrow mark X direction and the arrow mark Y direction constitute an angle of substantially 90 degree.

According to the conventional apparatus of cutting the metal pipe 1 having such a constitution, portions of the metal pipe 1 forward and rearward from the cut position are fixedly held by the holding holes 8a and 9a of the holding members 2a and 3a and the holding members 2b and 3b and successively, the cut-off blade 5 is firstly moved in the direction orthogonal to the central axis line of the metal pipe 1 indicated by the arrow mark X direction of FIG. 5 relative to the metal pipe 1 and a portion of the pipe wall of the metal pipe 1 is cut off in the tangential direction by the cut-off blade 5.

Successively, the cut blade 6 is moved from the direction orthogonal to the central axis line of the metal pipe 1 indicated by the arrow mark Y direction of FIG. 5 and at the deficient wall portion of the metal pipe 1 where a portion of the metal wall has been cut off, the metal pipe 1 is cut by the cut blade 6 from the deficient wall portion.

However, according to the conventional apparatus of cutting the metal pipe 1, in cutting of f a portion of the pipe wall in the tangential direction by the cut-off blade 5, when angular moment is applied on the metal pipe 1 in the clockwise direction by the cut-off blade 5 as shown by an arrow mark M direction in FIG. 6 and the angular moment exceeds frictional force based on static frictional coefficient between peripheral faces of the holding holes 8a and 9a and the metal pipe 1, the metal pipe 1 is rotated at insides of the holding holes 8a and 9a.

When such a rotation by the angular moment in the arrow mark M direction is caused, not only scratch marks are produced at the outer peripheral face of the metal pipe 1 but also the metal pipe 1 is stopped at a cut-off position which is not in parallel with the arrow mark X direction but is inclined to the X direction by an angle as shown by FIGS. 7A and 7B as a result of the cut-off operation by the cut-off blade 5.

Further, when cutting operation is started by the cut blade 6 under the state, the cutting operation is started from a portion of the metal pipe 1 where a portion of the pipe wall is not cut off or a portion thereof where an extremely small amount of the pipe wall is cut off and accordingly, burrs cannot be produced symmetrically in the left and right direction relative to the cut blade 6 and an extremely irregular or deformed cut face is constituted.

Further, even when the cut-off step is finished without rotating the metal pipe, in finally cutting the metal pipe by the cut blade 6, there is brought about a state in which a lower side of the cut face of the metal pipe 1 is more roughened and deformed than an upper side thereof since the cutting operation is finished while the lower side of the cut face is being pressed by burrs from an inner face of the metal pipe.

In order to prevent various problems posed by rotating the metal pipe 1 from causing in the cut-off step, conventionally, widths of holding the metal pipe 1 by the holding members 2a and 3a and the holding members 2b and 3b, are widened, a circle formed by inner peripheral faces of the holding holes 8a and 9a is deviated from a completely round circle into an ellipse having a longer length in the vertical direction and an outer peripheral face of the metal pipe 1 is held while deforming the metal pipe 1 into the elliptical shape while exerting strong tightening force to the holding members 2a and 3a and the holding members 2b and 3b to thereby carry out the cut-off operation.

Accordingly, there poses a problem in which particularly in the case of a thin-walled one of the metal pipe 1, at a vicinity of the cutting portion of the metal pipe 1 after having been cut to penetrate, as shown by FIG. 8, the metal pipe 1 is frequently deformed in an elliptical shape deviated from a completely round circle.

Further, in the case of a resin-coated metal pipe 11 produced by providing a resin coating layer 7 on the outer peripheral face of the metal pipe 1, the resin coating layer 7 is cut off in the tangential direction along with a portion of the pipe wall of the metal pipe 1 by the cut-off blade 5 and successively, the cutting operation by the cut blade 6 is started from a position of the deficient wall portion where the portion of the pipe wall is cut off. At an instance at which the cut blade 6 exerts shear force from above the resin-coated metal pipe 11, the resin coating layer 7 having Young's modulus far smaller than that of the metal pipe 1 is deformed to compress at insides of the holding holes 8a and 9a on the side of the deficient wall portion and the cutting operation is progressed under the state. As a result, at a final portion, that is, immediately before finishing the cutting operation, an inner peripheral end face of the metal pipe 1 is partially deformed toward an outer side and as shown by FIG. 9, a shear droop portion 10 is produced at the portion of cutting the metal pipe 1 and a highly accurate cutting operation may not be carried out.

SUMMARY OF THE INVENTION

The invention relates to a method of cutting a metal pipe for cutting a metal pipe orthogonally to a central axis line of the metal pipe and an apparatus, capable of effectively cutting even a metal pipe coated with a resin coating layer at an outer peripheral face thereof.

The invention has been carried out in view of a current situation of cutting by a conventional apparatus of cutting a metal pipe or a resin-coated metal pipe of this kind, described above, and it is an object of the invention to provide a method of cutting a metal pipe or a resin-coated metal pipe with high accuracy by preventing the metal pipe or the resin-coated metal pipe from being rotated, preventing burrs in cutting from being caused and preventing a cutting face from being deformed and preventing shear droop caused by a resin coating layer of the resin-coated metal pipe from being produced, and an apparatus to implement the same.

In order to achieve the above-described object, according to a first aspect of the invention, there is provided a method of cutting a metal pipe which is a method of cutting the metal pipe orthogonally to a central axis line of the metal pipe, the method comprising a step of sandwiching an outer peripheral face of the metal pipe from a direction orthogonal to the central axis line, a step of simultaneously cutting off portions of a pipe wall held in the sandwiching step and opposed to each other in a diameter direction of the metal pipe orthogonally to the central axis line and substantially in a same direction of tangential lines of the metal pipe and a step of cutting the metal pipe from one of deficient wall portions cut off in the cutting off step toward other of the deficient wall portions orthogonally to the central axis line.

Further, according to a second aspect of the invention, there is provided an apparatus of cutting a metal pipe, which cuts the metal pipe orthogonally to a central axis line of the metal pipe, the apparatus comprising a pair of first holding members capable of being opened and closed in a direction orthogonal to the central axis line of the metal pipe and in directions opposed to each other and having holding holes in a semicircular shape having a radius of curvature substantially equal to a radius of curvature of an outer peripheral face of the metal pipe, a pair of second holding members having holding holes substantially the same as the holding holes of the pair of first holding members and provided to be spaced apart from the pair of first holding members in an axial direction of the metal pipe, a pair of cut-off blades movable in synchronism with each other in the direction orthogonal to the central axis line for simultaneously cutting off portions of a pipe wall of the metal pipe opposed to each other in a diameter direction of the metal pipe substantially in a same tangential direction and a cut blade for cutting to penetrate the metal pipe from one of deficient wall portions where the portion of the pipe wall has been cut to other of the deficient wall portions where the portion of the pipe wall has been cut orthogonally to the central axis line by moving in an interval between the two pairs of holding members.

BRIEF DESCRIPTION OF THE DRAWINGS

FIGS. 2A and 2B are explanatory views of states before and after a metal pipe is cut by first cutting means according to the invention in which FIG. 2A is an explanatory view showing a state before portions of a pipe wall are cut off and FIG. 2B is an explanatory view showing a state, in which the portions of the pipe wall have been cut off and before the metal pipe is cut to be penetrated;

FIGS. 3A and 3B are explanatory views of states before and after a metal pipe is cut by second cutting means according to the invention in which FIG. 3A is an explanatory view showing a state before the portions of a pipe wall are cut off and FIGS. 3B is an explanatory view showing a state in which the portions of the pipe wall have been cut off and before the metal pipe is cut to be penetrated;

FIGS. 7A and 7B are views showing a state of cutting a metal pipe by the conventional apparatus, in which FIG. 7A is a view showing a state before a portion of a pipe wall is cut off and FIG. 7B is a view showing a state after the portion of the pipe wall has been cut off;

DETAILED DESCRIPTION OF THE PREFERRED EMBODIMENTS

Next, an explanation will be given of the invention in reference to FIG. 1 through FIG. 4.

Figure 1:
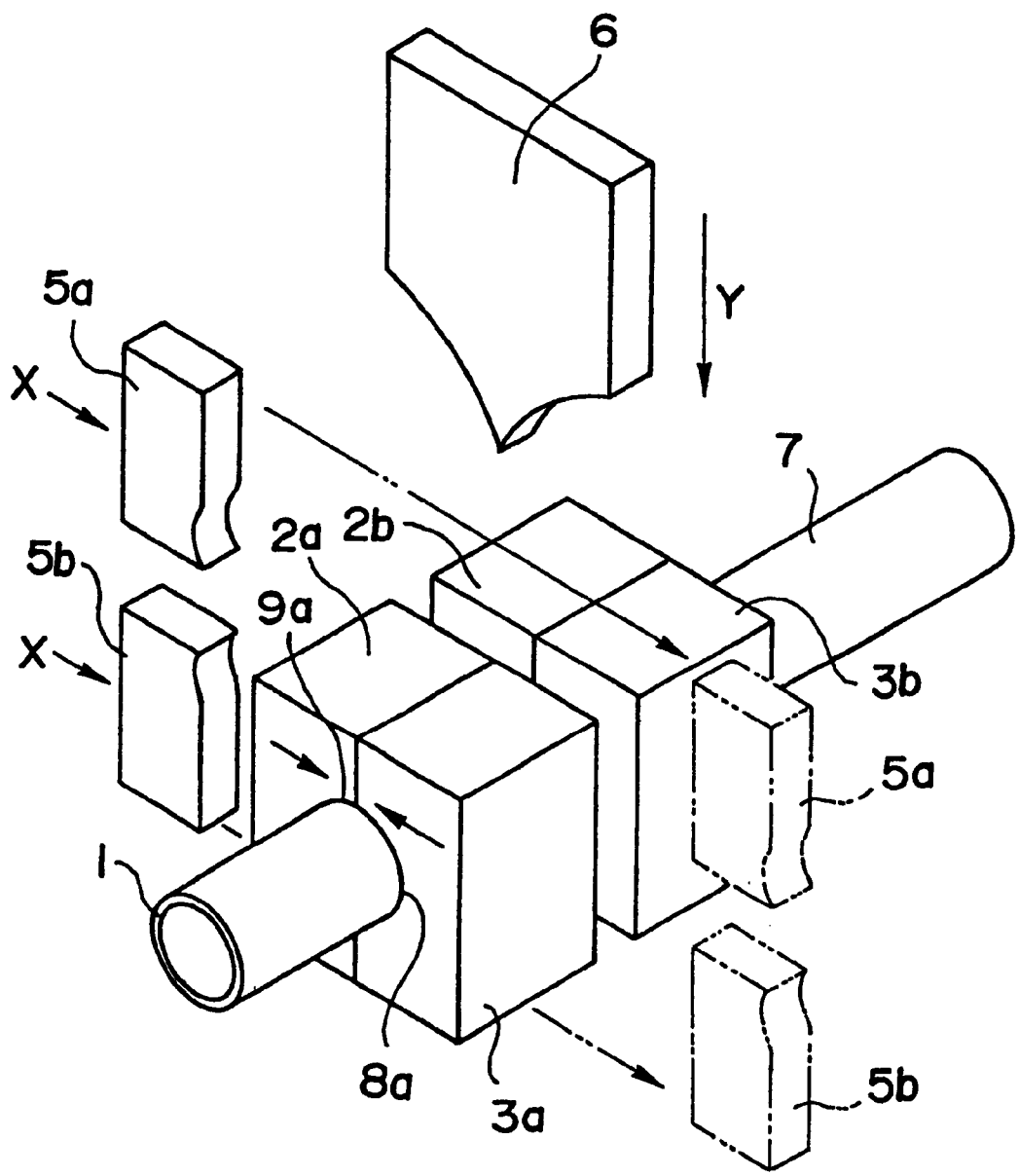
FIG. 1 is an explanatory perspective view showing an embodiment of an apparatus of cutting a metal pipe according to the invention.
Figure 2:
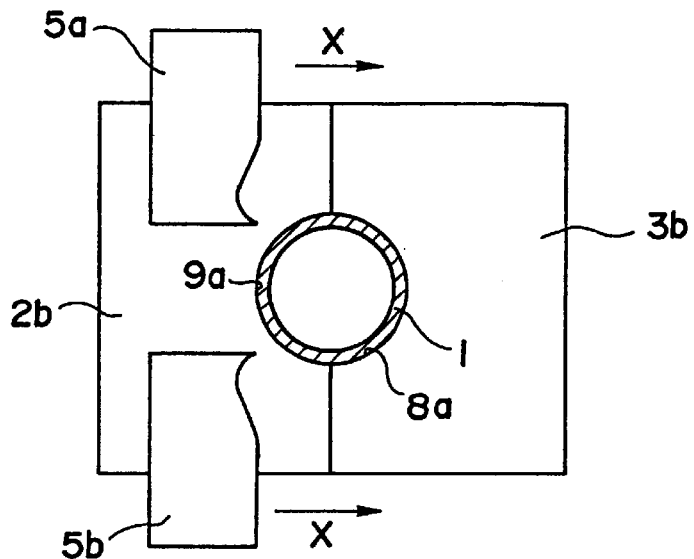
Figure 2:
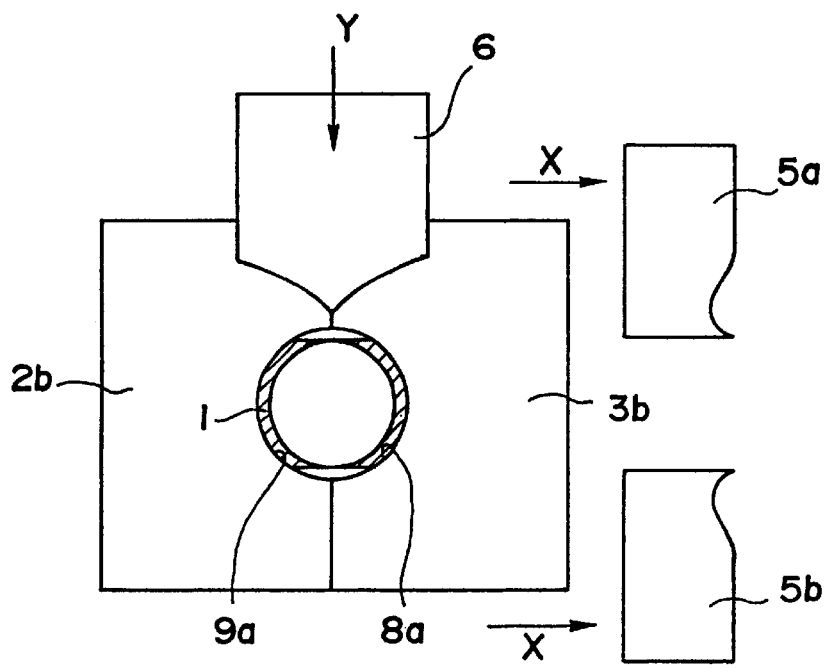
Figure 3:
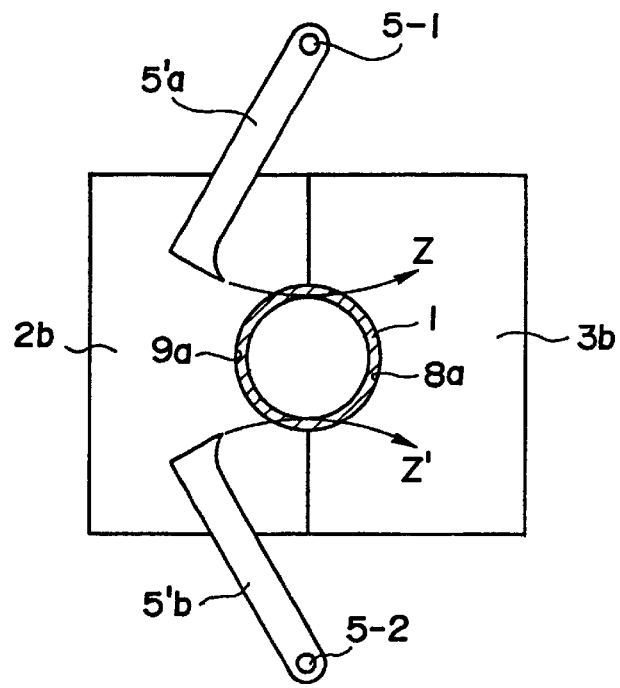
Figure 3:
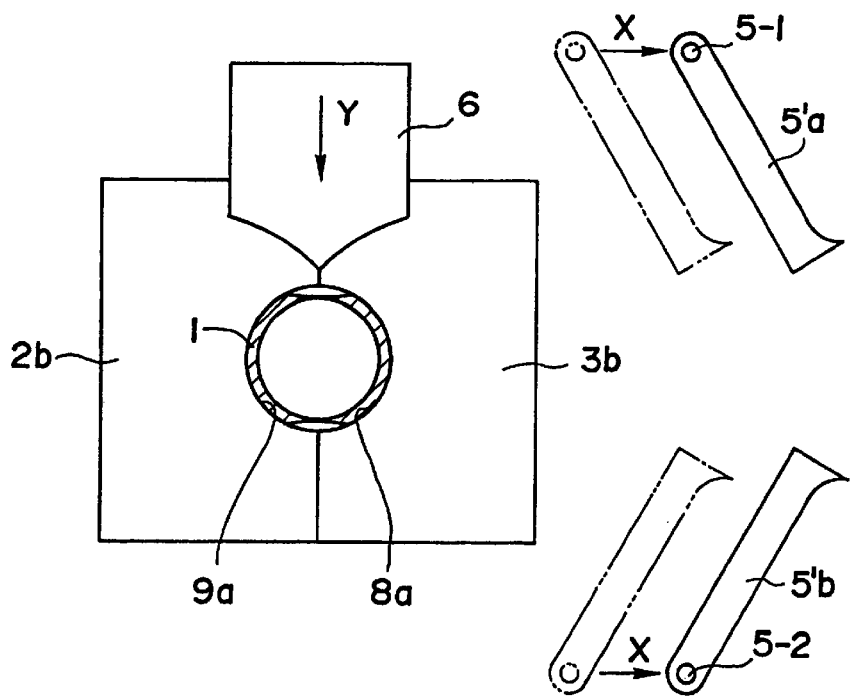

According to the invention, as shown by FIG. 1, the metal pipe 1 to be cut comprises a metal pipe in a thin-walled shape and in cutting the metal pipe 1, the metal pipe 1 is held in semicircular holding holes 8a and 9a (in the drawing only one hole provided on the holding members 2a, 3a is illustrated ) which are defined respectively by a pair of holding members 2a, 3a and another pair of holding members 2b, 3a opposed to the holding members 2a, 3a. The pair of holding members 2a, 3a is arranged oppositely to each other in a direction orthogonal (horizontal, in the illustrated embodiment) to the central axis live of the metal pipe 1 and capably to open and close.

The other pair of holding members 2b, 3b has the same shape and construction as those of the holding members 2a, 3a arranged apart from the holding members 2b, 3b in the axial direction of the metal pipe 1.

In respect of the metal pipe 1, in order to cut off portions of the pipe wall at portions of the metal pipe 1 opposed to each other in the diameter direction of the metal pipe 1 (in the illustrated embodiment, portions of the pipe wall in the up and down direction) in the same tangential direction, a pair of cut-off blades 5a and 5b are arranged between the two pairs of the holding members 2a and 3a and 2b and 3b. In the illustrated example, the cut-off blade 5a for cutting off a portion of the pipe wall on the upper side on a straight line, is arranged movably in the arrow mark X direction (horizontal direction) orthogonal to the central axis line of the metal pipe 1 and the cut-off blade 5b for cutting a portion of the pipe wall on the lower side of the metal pipe 1, is arranged movably on a straight line similarly in the arrow mark X direction. Further, the two cut-off blades 5a and 5b are movable on the straight lines in synchronism with each other while maintaining in parallel with each other.

Further, at deficient wall portions opposed to each other in the diameter direction in which portions of the pipe wall have been cut off by the cut-off blades 5a and 5b, there is arranged the cut blade 6 moving in the arrow mark Y direction (vertical direction) orthogonally to the central axis line of the metal pipe 1 and with an angle of 90 degrees to the direction of moving the cut-off blades 5a and 5b to thereby cut to penetrate the metal pipe 1.

An explanation will be given of operation of cutting the metal pipe 1 by the cutting apparatus according to the invention having such a constitution.

According to the invention, portions-of the metal pipe 1 forward and rearward from the cutting position of the metal pipe 1 are held to be sandwiched respectively by insides of the holding holes 8a and 8b of the pairs of the holding members 2a and 3a and the holding members 2b and 3b. The cut-off blades 5a and 5b are firstly moved on the straight lines in synchronism with each other while maintaining to be in parallel with each other orthogonally to the central axis direction as shown by the arrow mark X directions of FIG. 2A relative to the metal pipe 1 held in this way and portions of the pipe wall opposed to each other in the diameter direction of the metal pipe 1 are respectively cut off simultaneously by the cut-off blades 5a and 5b in the same tangential direction.

Thereby, portions opposed to each other in the diameter direction of the pipe wall (an upper side portion and a lower side portion in the drawing) of the metal pipe 1 held to be sandwiched by insides of the holding holes 8a and 8b of the holding members 2a and 3a and the holding members 2b and 3b (in FIGS. 2A and 2B, the holding members 2a and 3a are omitted), are cut off by moving the cut-off blades 5a and 5b in synchronism with each other in the arrow mark X directions as shown by FIG. 2A.

Successively, the cut blade 6 is moved in the direction orthogonal to the central axis line of the metal pipe 1 designated by the arrow mark Y direction in FIG. 2B and the metal pipe 1 is cut to be penetrated by the cut blade 6 from a position of a deficient wall portion where the upper side portion of the metal pipe 1 has been cut off toward a deficient wall portion where the lower portion has been cut.

According to the invention, in cutting off the portions of the pipe wall of the metal pipe 1 at the cutting position, the portions of the pipe wall of the metal pipe 1 opposed to each other in the diameter direction, are simultaneously cut off in the same tangential direction by the cut-off blades 5a and 5b synchronously driven on the straight lines and accordingly, angular moments are applied on the metal pipe 1 in directions opposed to each other by bringing the cut-off blades 5a and 5b into contact with the metal pipe 1 and cutting off the portions of the pipe wall and therefore, the angular moments are canceled by each other and accordingly, rotational force is not exerted to the metal pipe 1. Therefore, it is not necessary to exert strong tightening force by the holding members 2a and 3a and the holding members 2b and 3b and form the circle defined by the inner peripheral faces of the holding holes 8a and 9a into an elliptical shape, while the metal pipe 1 is prevented from being deformed and scratch marks on the outer peripheral face caused by the rotation are dispensed with. Further, the widths between the holding members 2a and 3a and the holding members 2b and 3b can be made small and a chuck mechanism having the holding members, can be downsized, simplified and constituted at a low fabrication cost.

Further, in cutting the metal pipe by the cut blade 6, since the portions of the pipe wall of the metal pipe 1 opposed to each other in the diameter direction have been cut off simultaneously in the same tangential direction, the metal pipe 1 is cut at the deficient wall portions where the portions of the pipe wall opposed to each other in the diameter direction have been cut off or the deficient wall portions where thick-walled portions have been thinned and the cutting operation is started by disposing a tip end of the cut blade 6 accurately at the deficient wall portion which is removed of the cut-off portion or thinned, as a result of cutting the metal pipe symmetrically in the left and right direction relative to the cut blade 6, burrs are produced symmetrically in the left and right direction, the cut face is prevented from being roughened and the deformation of the cut face can be prevented. Further, the portion on the lower side of the pipe wall has been cut off and accordingly, the cut face on the lower side of the metal pipe 1 is not roughened.

Further, according to the above-described embodiment, there has been shown an example of cutting off the portions of the pipe wall by using the two cut-off blades 5a and 5b movable in synchronism with each other on the straight lines. However, the present invention is not limited to such cut-off blades but there can be used cut-off blades 5'a and 5'b pivotable in arrow marks Z and Z' directions relatively to each other centering on support shafts 5-1 and 5-2 to circularly cut the metal pipe in synchronism with each other as shown by FIGS. 3A and 3B and the cut-off blades 5'a and 5'b are constituted progressably and regressably in the arrow mark X directions or directions reverse thereto such that the cut-off blades 5'a and 5'b do not interfere with the cut blade 6 in the cutting operation by the cut blade 6 which is carried out in the later step.

That is, portions of the pipe wall of the metal pipe 1 opposed to each other in the diameter direction which are held by sandwiching a cutting position of an outer peripheral face thereof by portions forward and rearward from the cutting position by the holding holes 8a and 9a in a semicircular shape respectively formed at opposed faces of the pair of holding members 2a and 3a and the other pair of holding member 2b and 3b, are cut off substantially in a U-like shape having a large radius of curvature by pivoting the cut-off blades 5'a and 5'b in the directions of the arrow marks Z and Z' relatively to each other and in synchronism with each other centering on the support shafts 5-1 and 5-2.

Successively, after the cut-off blades 5'a and 5'b regress in the arrow mark X direction, similarly to the above-described embodiment, at the deficient wall portions opposed to each other in the diameter direction where the portions of the pipe wall have been cut off by the cut-off blades 5'a and 5'b, the metal pipe 1 is cut to be penetrated by the cut blade 6 moving orthogonally to the central axis line of the metal pipe 1 and in the arrow mark Y direction (vertical direction) with an angle of 90 degrees to the moving directions of the cut-off blades 5'a and 5'b.

Further, according to the invention, both of cutting off the portions of the pipe wall in the same tangential direction by moving of the cut-off blades 5a and 5b and cutting off the portions of the pipe wall substantially in the U-shape with a large radius of curvature by pivoting of the cut-off blades 5'a and 5'b, are defined as "cutting off substantially in the same tangential direction" and such a technical term is used.

Further, according to the above-described embodiments, an explanation has been given of the examples of using the pair of cut-off blades 5a and 5b moving on the straight lines and the pair of pivoting cut-off blades 5'a and 5'b. However, there can also be constructed a constitution in which the cut-off blade 5a moving on the straight line is used in cutting off the portion of the pipe wall on the upper side whereas the pivoting cut-off blade 5'b is used in cutting off the portion of the pipe wall on the lower side, or contrary thereto, the pivoting cut-off blade 5'a is used in cutting off the portion of the pipe wall on the upper side whereas the cut-off blade 5b moving on the straight line is used in cutting off the portion of the pipe wall on the lower side so far as the both are operated in synchronism with each other.

Figure 4:
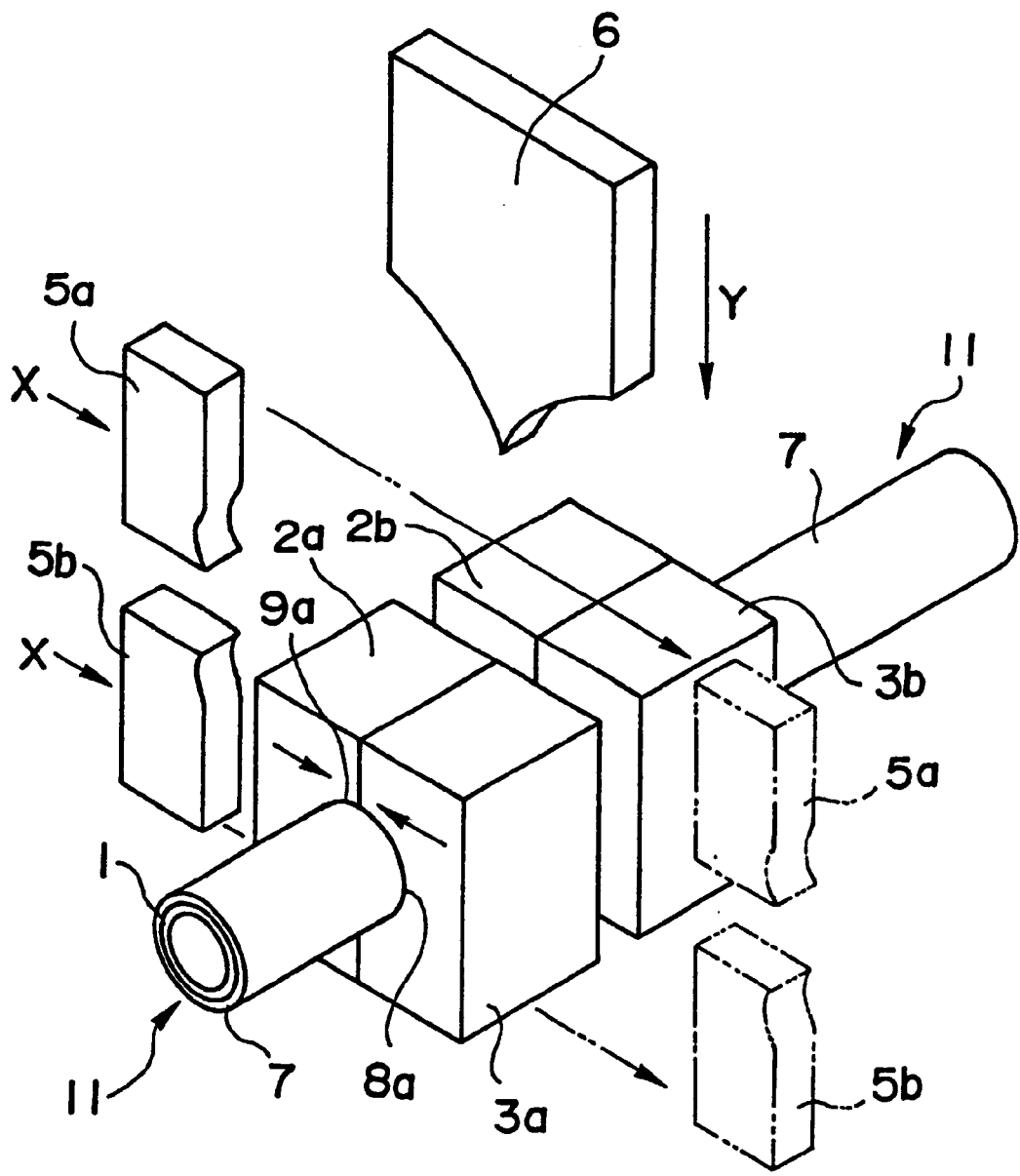
FIG. 4 is an explanatory perspective view in the case in which the cutting apparatus according to the invention is used in cutting a resin-coated metal pipe.
Figure 5:
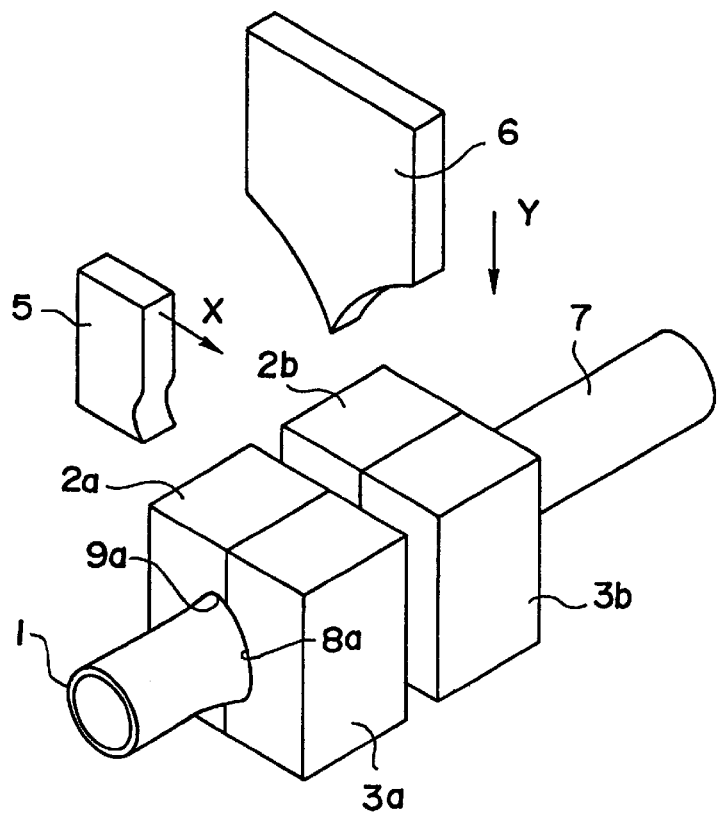
FIG. 5 is a perspective view showing a constitution of a conventional apparatus of cutting a metal pipe.
Figure 6:
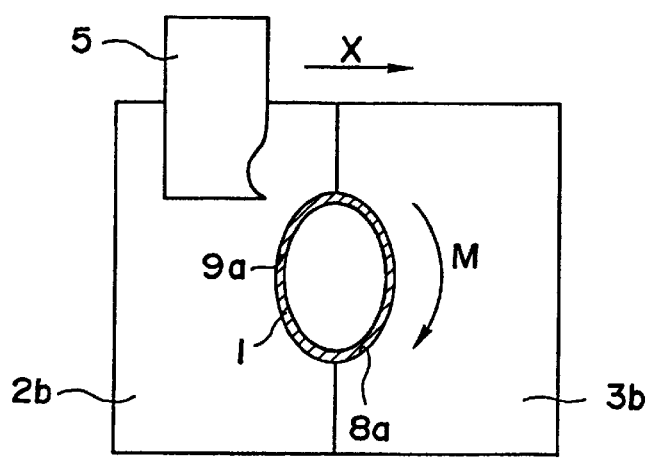
FIG. 6 is an explanatory view showing a state before a portion of a pipe wall is cut off by the conventional apparatus of cutting a metal pipe.
Figure 7:
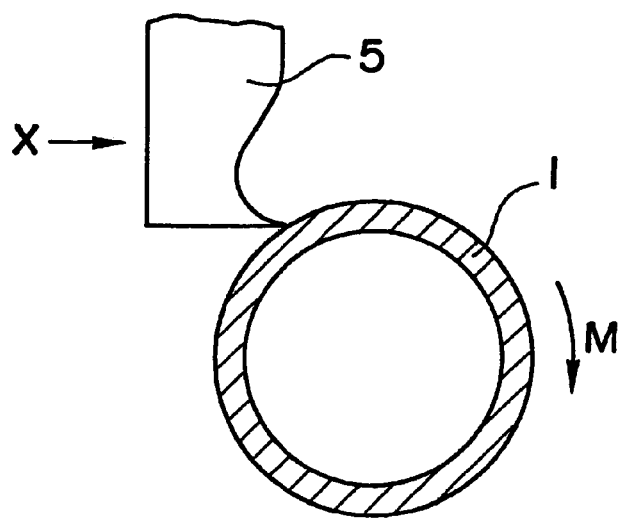
Figure 7:
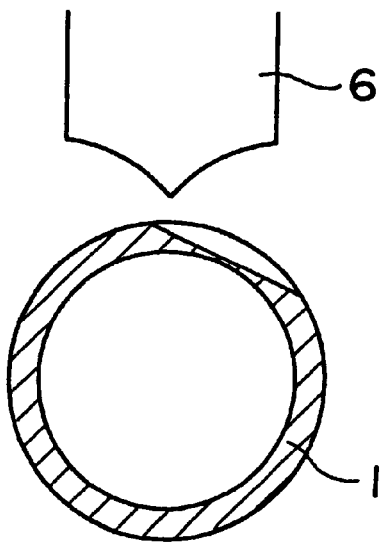
Figure 8:
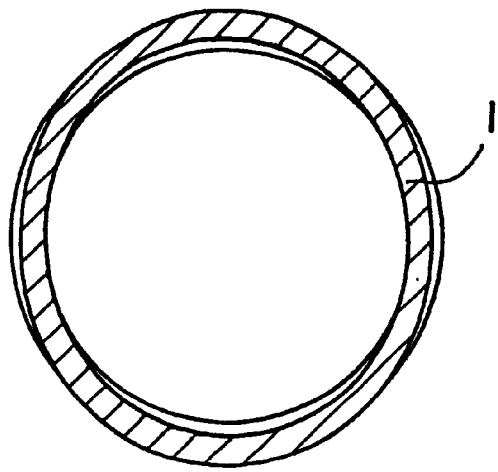
FIG. 8 is a cross-sectional view showing deformation of the metal pipe which has been cut by the conventional cutting apparatus.
Figure 9:
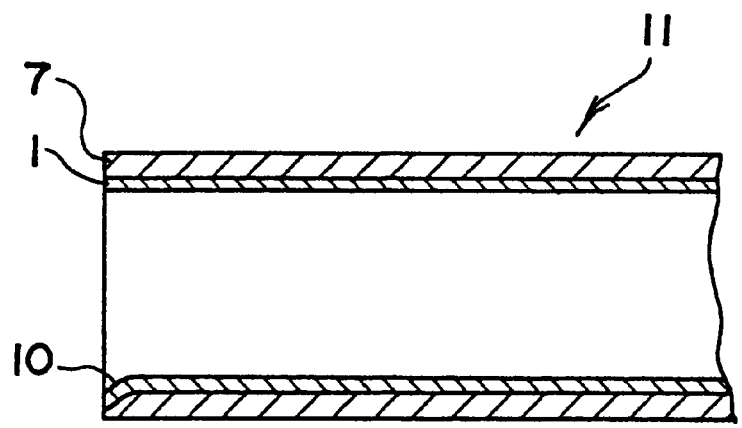
FIG. 9 is a longitudinal sectional view showing production of a shear droop portion of a resin-coated metal pipe cut by the conventional cutting apparatus.

Further, an explanation will be given as follows of the case of using the cutting apparatus according to the invention in the resin-coated metal pipe 11 provided with the resin coating layer 7 on an outer peripheral face thereof in reference to FIG. 4.

In cutting off the resin coating layer 7 at the cutting position, portions of the metal pipe 1 and the resin coating layer 7 of the resin-coated metal pipe 11 opposed to each other in the diameter direction, are simultaneously cut off in the same tangential direction by the cut-off blades 5a and 5b synchronously driven on the straight lines, and similarly to the above-described embodiments, rotational force is not exerted to the resin-coated metal pipe 11 in bringing the cut-off blades 5a and 5b into contact with the metal pipe 1 and the resin coating layer 7 and cutting off the portions of the pipe wall. Therefore, it is not necessary to exert strong tightening force by the holding members 2a and 3a and the holding members 2b and 3b and resin-coated metal pipe 11 as a whole is prevented from being deformed. Further, also in the case of using the apparatus for the resin-coated metal pipe 11, the widths between the holding members 2a and 3a and the holding members 2b and 3b can be made small and a chuck mechanism having the holding members can be downsized, simplified and constituted at a low fabrication cost.

Next, since in cutting by the cut blade 6, the pipe wall of the metal pipe 1 and the resin coating layer 7 have simultaneously been cut off in the same tangential direction at the portions of the resin-coated metal pipe 11 opposed to each other in the diameter direction and the resin-coated metal pipe 11 is cut by the cut blade 6 at positions (positions in up and down direction) where portions of the resin coating layer 7 opposed to each other in the diameter direction have been removed and accordingly, in cutting the metal pipe by the cut blade 6, a shear droop portion of the cut portion caused by deforming to compress the resin coating layer 7 is prevented from being produced at the resin coating layer 7 having small Young's modulus and the resin-coated metal pipe 11 can be cut generally with high accuracy.

Further, in cutting off the portions of the resin-coated metal pipe 11, the above-described pair of pivoting cut-off blades 5'a and 5'b can naturally be used. Further, although according to the illustrated embodiments, an explanation has been given of the apparatus in which the holding members 2a and 3a and 2b and 3b are made to be capable of being opened and closed in the horizontal direction, the cut-off blades 5a and 5b are made movable in the horizontal direction and the cut blade 6 is made movable in the vertical direction, even when the holding members 2a and 3a and 2b and 3b are made to be capable of being opened and closed in the vertical direction, the cutoff blades 5a and 5b are made movable in the vertical direction and the cut blade 6 is made movable in the horizontal direction, the present invention can be carried out with no difference in operation and effect thereof.

As has been described, according to the invention, the metal pipe is not rotated to dislocate in cutting off the portions of the pipe wall and accordingly, deformation of the metal pipe and scratch marks on the outer peripheral face thereof can be prevented from being caused, while it is not necessary to increase force of tightening the holding members, the widths of holding the holding members can be reduced, and in cutting the metal pipe, burrs are prevented from being caused, the cutting face is prevented from being deformed, further, in cutting the resin-coated metal pipe, shear droop at the cutting portion is prevented from being caused and accordingly, the metal pipe or the resin-coated metal pipe can be cut with high accuracy.

What is claimed is:

1. An apparatus for cutting a metal pipe orthogonally to a central axis of the metal pipe, said apparatus comprising:

a pair of first holding members capable of being opened and closed in a direction orthogonal to the central axis of the metal pipe and in directions opposed to each other and having semicircular holding recess with a radius of curvature substantially equal to a radius of curvature of an outer peripheral face of the metal pipe;

a pair of second holding members having holding recesses substantially the same as the holding recesses of the pair of first holding members and to define a space between the pair of first holding members and the pair of second holding members in an axial direction of the metal pipe;

first and second cut-off blades movable in synchronism with each other in a direction orthogonal to the central axis line for simultaneously cutting off first and second portions of a pipe wall of the metal pipe opposed to each other in a diameter direction of the metal pipe and substantially in a same tangential direction such that the cut-off blades define first and second opposite cuts; and a cut blade movable substantially perpendicular to the movement of the first and second cut-off blades and into the space between the pairs of holding members for cutting to penetrate the metal pipe from the first cut to the second cut.

2. The apparatus of cutting a metal pipe according to claim 1:

wherein the cut-off blades are movable on straight lines in synchronism with each other.

3. The apparatus of cutting a metal pipe according to claim 1:

wherein the cut-off blades can be pivoted relatively to each other centering on the support shafts in synchronism with each other.

* * * * *